United States Patent
Kim et al.

(10) Patent No.: US 12,449,689 B2
(45) Date of Patent: *Oct. 21, 2025

(54) POLYMER DISPERSED LIQUID CRYSTAL DISPLAY WITH THE IMPROVED ANGULAR HAZE FOR SUNROOF

(71) Applicant: LIVICON. CO., LTD, Chungcheongbuk-do (KR)

(72) Inventors: Bong Hee Kim, Chungcheongbuk-do (KR); Seunggi Kim, Chungcheongbuk-do (KR); Hyo Jeong Do, Chungcheongbuk-do (KR); Kyeong-Jin Kim, Chungcheongbuk-do (KR)

(73) Assignee: LIVICON. CO., LTD, Chungcheongbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,293

(22) Filed: Jul. 10, 2024

(65) Prior Publication Data

US 2025/0053040 A1    Feb. 13, 2025

(30) Foreign Application Priority Data

Aug. 10, 2023    (KR) .................. 10-2023-0104609

(51) Int. Cl.
| | | |
|---|---|---|
| *G02F 1/1333* | (2006.01) | |
| *C09K 19/30* | (2006.01) | |
| *C09K 19/54* | (2006.01) | |
| *G02F 1/1334* | (2006.01) | |
| *G02F 1/1343* | (2006.01) | |

(52) U.S. Cl.
CPC ........ *G02F 1/1334* (2013.01); *C09K 19/3003* (2013.01); *C09K 19/544* (2013.01); *G02F 1/13439* (2013.01); *C09K 2019/3004* (2013.01); *C09K 2019/3019* (2013.01); *C09K 2019/3025* (2013.01); *C09K 2019/548* (2013.01); *C09K 2219/03* (2013.01)

(58) Field of Classification Search
CPC ...... G02F 1/1333; G02F 1/1334; G02F 1/139; C09K 19/38; C09K 19/544; C09K 2019/0444; C09K 2019/0448
See application file for complete search history.

(56) References Cited

U.S. PATENT DOCUMENTS

| | | | |
|---|---|---|---|
| 9,146,415 B2 * | 9/2015 | Baek | .................... C09K 19/544 |
| 2020/0183203 A1 | 6/2020 | Tanabe et al. | |
| 2025/0053040 A1 * | 2/2025 | Kim | ...................... C09K 19/544 |
| 2025/0053041 A1 * | 2/2025 | Kim | ...................... G02F 1/1334 |

FOREIGN PATENT DOCUMENTS

| | | | | |
|---|---|---|---|---|
| CN | 111040775 A | * | 4/2020 | ............. C09K 19/44 |
| CN | 116165819 | | 5/2023 | |
| JP | 08-201780 A | * | 8/1996 | ........... G02F 1/1333 |
| JP | 2016-027008 A | | 2/2016 | |
| KR | 960040278 A | | 12/1996 | |
| KR | 10-2047783 B1 | | 11/2019 | |
| KR | 102500809 B1 | * | 2/2023 | ........... G02F 1/1334 |
| WO | WO 2018153803 A1 | * | 8/2018 | ............. C09K 19/54 |
| WO | 2020229434 A1 | | 11/2020 | |

OTHER PUBLICATIONS

Hu et al., "Colored PDLC Films with Wide Gamut Range", Aug. 5, 2023, Crystals, vol. 13, Issue 8, p. 1216 (Year: 2023).*
Machine translation of KR 102500809 B1 (Year: 2023).*
Machine translation of CN-111040775-A (Year: 2020).*
Machine translation of JP 08-201780-A (Year: 1996).*
Extended European Search Report from corresponding EP Application No. 24193415.7, dated Dec. 16, 2024.

* cited by examiner

*Primary Examiner* — Geraldina Visconti
(74) *Attorney, Agent, or Firm* — Harness, Dickey & Pierce, P.L.C.

(57) ABSTRACT

One embodiment of the present application provides a polymer dispersed liquid crystal display including a first electrode, a second electrode on the first electrode, and a PDLC layer placed between the first electrode and the second electrode, the PDLC layer includes a liquid crystal droplet with a size in the range of 0.8 to 1.5 μm, and the PDLC layer has a thickness in the range of 15 to 25 μm.

10 Claims, 5 Drawing Sheets

POLYMER DISPERSED LIQUID CRYSTAL DISPLAY WITH THE IMPROVED ANGULAR HAZE FOR SUNROOF

CROSS-REFERENCE TO RELATED APPLICATIONS

This application claims the benefit of priority of the Korean Patent Application No. 10-2023-0104609 filed on Aug. 10, 2023, which is hereby incorporated by reference as if fully set forth herein.

FIELD

This present application is about a type of smart window, a Polymer Disposed Liquid Crystal Display (PDLCD), and more specifically, a Polymer Disposed Liquid Crystal Display (PDLCD), in which an angular haze is improved in an electric transmission state.

BACKGROUND

Polymer dispersed liquid crystal (PDLC) displays have advantages of being simple to manufacture and low power consumption. PDLC displays are currently one of the most widely used smart windows.

In general, a polymer dispersed liquid crystal display (PDLCD) has a liquid crystal dispersed in the polymer system, in the absence of an initial potential difference, the scattered state in which incident light is scattered can be controlled and by applying a potential difference to the film and aligning the liquid crystal molecules in the same direction as the light direction, the transparent state in which incident light passes without scattering can be controlled.

In the case of a polymer dispersed liquid crystal display (PDLCD), a haze difference occurs between the front and the side, and the haze on the side is high and a clearer image than the front cannot be obtained. The reason why this side haze is important is that when a polymer distributed liquid crystal display (PDLCD) is applied to a sunroof, the occupant mostly looks at the polymer distributed liquid crystal display (PDLCD) from the side rather than the front. Specifically, when the polar angle viewed by the occupant from the front is 0°, the occupant looks at the polymer dispersed liquid crystal display (PDLCD) from an angle of 60° to 70°, so it is very important to improve the side haze.

Therefore, research is continuously being conducted to improve haze on the side in polymer dispersed liquid crystal displays (PDLCDs).

SUMMARY

An embodiment of the present application is to provide a polymer dispersed liquid crystal display with improved side haze.

An embodiment of the present application is to provide a smart window manufactured using a polymer dispersed liquid crystal display.

In addition to the objects of the present disclosure as mentioned above, additional objects and features of the present disclosure will be clearly understood by those skilled in the art from the following description of the present disclosure.

One embodiment of the present application to achieve the above technical problem provide a polymer dispersed liquid crystal display including a first electrode, a second electrode on the first electrode, and a PDLC layer placed between the first electrode and the second electrode, the PDLC layer includes a liquid crystal droplet with a size in the range of 0.8 to 1.5 μm, and the PDLC layer has a thickness in the range of 15 to 25 μm.

The liquid crystal droplet may have refractive index anisotropy in the range of 0.20 to 0.25.

The liquid crystal droplet may have a transparent point of 90° C. or higher.

The liquid crystal droplet may include a first compound represented by Chemical Formula 1.

The first compound may be 3 to 20% by weight based on the total content of the liquid crystal droplets.

The liquid crystal droplet may further include a second compound represented by Formula 2.

The second compound may have a concentration in the range of 50 to 1000 ppm.

The PDLC layer may further include a polymer and the polymer may be formed of a polymer precursor including a third compound represented by Chemical Formula 3.

The liquid crystal droplet may not contain a fourth compound represented by Chemical Formula 4.

The first electrode and the second electrode may include a transparent conductive material.

The transparent conductive material may include at least one of indium tin oxide (ITO) and indium zinc oxide (IZO).

Another embodiment of the present application provides a smart window manufactured using the polymer dispersed liquid crystal display.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figures 1, 2:
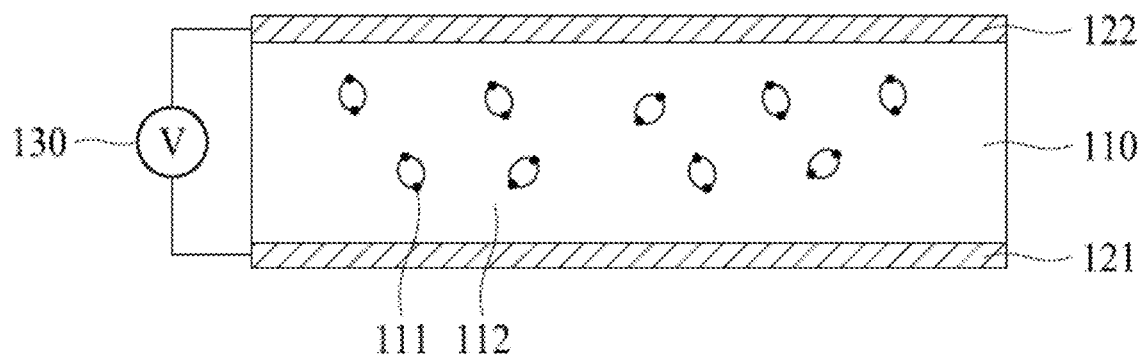
FIG. 1 is a cross-sectional view of a polymer dispersed liquid crystal display according to an embodiment of the present application.
FIG. 2 is an image according to a viewing angle when viewed from the front and the side through a polymer dispersed liquid crystal display in an on state.

Advantages and features of the present disclosure and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the present disclosure to those skilled in the art. Further, the present disclosure is only defined by scopes of claims.

A shape, a size, a ratio, an angle and a number disclosed in the drawings for describing embodiments of the present disclosure are merely an example and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have' and 'include' described in the present disclosure are used, another portion may be added unless 'only~' is used. The terms of a singular form may include plural forms unless referred to the contrary.

In construing an element, the element is construed as including an error band although there is no explicit description.

In describing a position relationship, for example, when the position relationship is described as 'upon~', 'above~', 'below~' and 'next to~', one or more portions may be disposed between two other portions unless 'just' or 'direct' is used.

Spatially relative terms such as "below", "beneath", "lower", "above", and "upper" may be used herein to easily describe a relationship of one element or elements to another element or elements as illustrated in the drawings. It will be understood that these terms are intended to encompass different orientations of the device in addition to the orientation depicted in the drawings. For example, if the device illustrated in the figure is reversed, the device described to be arranged "below", or "beneath" another device may be arranged "above" another device. Therefore, an exemplary term "below or beneath" may include "below or beneath" and "above" orientations. Likewise, an exemplary term "above" or "on" may include "above" and "below or beneath" orientations.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other and may be variously inter-operated with each other and driven technically as those skilled in the art can sufficiently understand. The embodiments of the present disclosure may be carried out independently from each other or may be carried out together in a co-dependent relationship.

In the addition of reference numerals to the components of each drawing describing embodiments of the present disclosure, the same components can have the same sign as can be displayed on the other drawings.

FIG. 1 is a cross-sectional view of a polymer dispersed liquid crystal display 100 according to an embodiment of the present application.

Referring to FIG. 1, a polymer dispersed liquid crystal display 100 may include a first electrode 121 and a second electrode 122.

Both the first electrode 121 and the second electrode 122 may include a transparent conductive material. For example, both the first electrode 121 and the second electrode 122 may include at least one of an indium tin oxide (ITO) and an indium zinc oxide (IZO). Preferably, the first electrode 121 and the second electrode 122 may be an indium tin oxide (ITO).

Referring to FIG. 1, the polymer dispersed liquid crystal display 100 may include a PDLC layer 110. Specifically, the PDLC layer 110 may be disposed between the first electrode 121 and the second electrode 122.

Although not shown in the drawings, the polymer dispersed liquid crystal display 100 may include a first substrate and a second substrate. Specifically, both the first substrate and the second substrate may include a transparent material. For example, the first substrate and the second substrate may include at least one of a single glass layer and a transparent plastic film.

According to an embodiment of the present application, the PDLC layer 110 may include liquid crystal droplets 111. Specifically, a plurality of liquid crystal droplets 111 may be distributed in the PDLC layer 110.

According to an embodiment of the present application, the PDLC layer 110 may include a polymer 112. Specifically, the PDLC layer 110 includes a liquid crystal droplet 111 and a polymer 112, and the polymer 112 surrounds the liquid crystal droplet 111.

The liquid crystal droplet 111 is phase-separated from the polymer 112. Specifically, when the polymer liquid crystal mixture 113 is cured, the PDLC layer 110 is formed, and the dispersibility of the liquid crystal droplet 111 and the polymer c2 in the PDLC layer 110 may increase (see FIGS. 4A and 4B). In this process, the polymer 112 is separated from the liquid crystal droplet 111 in a phase and may be distinguished from the liquid crystal droplet 111.

Figure 5:
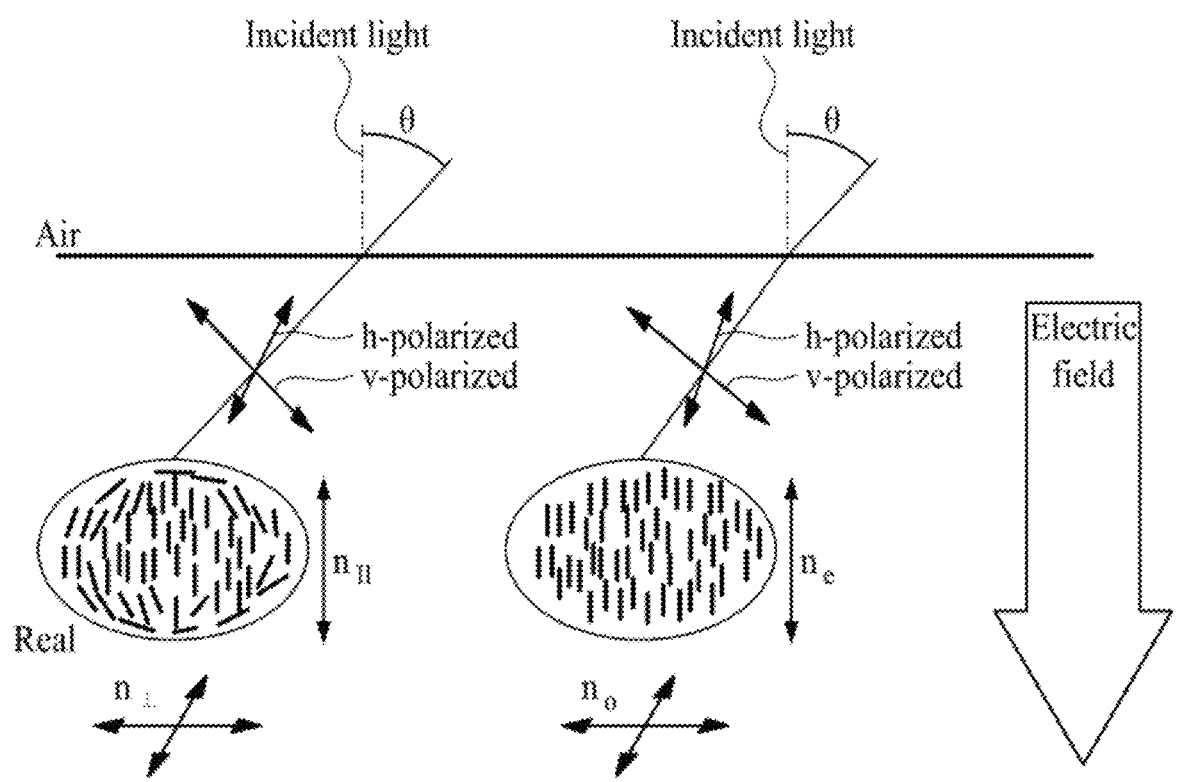
FIG. 5 is an image showing a liquid crystal arrangement and a refractive index in a liquid crystal droplet in a polymer dispersed liquid crystal display.

FIG. 5 is an image showing the arrangement and refractive index of liquid crystals of a polymer dispersed liquid crystal display. Specifically, FIG. 5 is an enlarged view of the liquid crystal droplet and shows a change in the refractive index n(θ) according to the alignment state of the liquid crystal in the liquid crystal drop and the incident angle of vertical polarization in an environment to which an electric field is applied.

The left image of FIG. 5 is an image showing an actual liquid crystal orientation state in a liquid crystal droplet.

The right image of FIG. 5 is an image showing an ideal liquid crystal orientation state in a liquid crystal droplet.

When the liquid crystals are arranged in the liquid crystal droplet as shown in the right image of FIG. 5, the refractive index ne(θideal) according to the incident angle of the vertical polarization may be expressed as a function of the refractive index ne of the ideal light and the refractive index of normal light (no) of the liquid crystals. In consideration of the above ideal matter, the smaller the refractive index ne(θideal) according to the incident angle of the vertical polarization, that is, the smaller the difference between the refractive index ne of the ideal light and the refractive index of the normal light, the lower the side haze of the transmission mode, but the haze characteristic of the scattering mode is also lowered.

However, as shown in the left image of FIG. 5, even if an electric field is applied to the polymer dispersed liquid crystal display, the liquid crystal is arranged along the curved surface on the surface of the polymer, and the liquid crystal becomes parallel to the electric field toward the center of the liquid crystal droplet. In this case, the refractive index (n ∥ (θreal) according to the incident angle of the vertical polarization of the liquid crystal droplet may be expressed as a function of the refractive index (n ∥) that is horizontal to the electric field and the refractive index (n ⊥) that is vertical to the electric field in the liquid crystal droplet. In this case, a relationship between ne>n ∥ and no<n ⊥ is established by the arrangement of the liquid crystals in the actual liquid crystal drop, and the difference between the two relationships increases as the size of the liquid crystal drop decreases. That is, when a polymer dispersed liquid crystal display is manufactured using a liquid crystal having the same refractive index anisotropy (ne–no), the smaller the size of the liquid crystal droplet, the smaller the actual refractive index anisotropy (n ⊥) in the liquid crystal droplet, so that the side haze decreases in the transmission mode, but the haze does not decrease in the scattering mode because the inherent refractive index anisotropy of the liquid crystal is maintained.

As described above, according to an embodiment of the present application, the liquid crystal droplet 111 may have a size in the range of 0.8 μm to 1.5 μm. When the size of the liquid crystal droplet 111 is in the range of 0.8 μm to 1.5 μm, when the polymer dispersed liquid crystal display 100 is used in a sunroof or the like, visibility with respect to a side viewing angle is improved.

On the other hand, when the liquid crystal droplet 111 has a size of less than 0.8 μm, a red wavelength is not scattered in the polymer dispersed liquid crystal display 100. As a result, the polymer dispersed liquid crystal display 100 has a generally red color.

Also, when the liquid crystal droplet 111 has a size greater than 1.5 μm, the liquid crystal droplet 111 in the PDLC layer 110 becomes excessively large, and haze from the side surface becomes large. As a result, when the polymer dispersed liquid crystal display 100 is used in a sunroof or the like, there is a problem in that visibility with respect to a side viewing angle is not improved. Therefore, in order to improve the side haze, the liquid crystal droplet 111 is adjusted in the range of 0.8 μm to 1.5 μm. More preferably, the liquid crystal droplet may be adjusted in the range of 0.8 μm to 1.3 μm.

According to an embodiment of the present application, the liquid crystal droplet 111 in the PDLC layer 110 is controlled by a curing condition in a process. Specifically, the curing condition is that the intensity of ultraviolet rays is 2 to 6 mW/cm$^2$, and the temperature during curing is 25 to 45° C. As a result, the size of the liquid crystal droplet 111 may be adjusted in the range of 0.8 to 1.5 μm.

According to an embodiment of the present application, the liquid crystal droplet 111 may have a transparent point of 90° C. or higher. The polymer dispersed liquid crystal display 100 is used for a vehicle sunroof or a smart window, and for example, the vehicle sunroof may have an external surface temperature of 90° C. or higher in summer. Accordingly, in order to use the polymer dispersed liquid crystal display 100 as a vehicle sunroof, the transparent point of the liquid crystal droplet 111 needs to be 90° C. or higher. Preferably, the transparent point of the liquid crystal droplet 111 may be 100° C. or higher. More preferably, it may be 110° C. or higher.

According to an embodiment of the present application, the liquid crystal droplet 111 may include a first compound represented by Chemical Formula 1.

[Chemical formula 1]

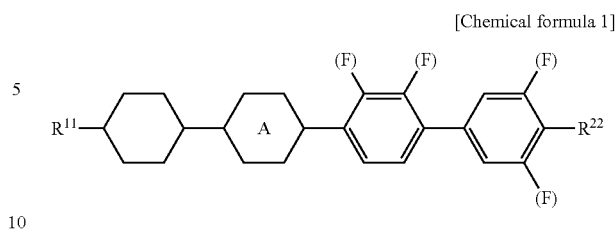

In Chemical Formula 1, $R^{11}$ refers to at least one of a C2-C10 alkyl group, an ethylene group, and an alkoxy group, ring A refers to a phenyl group or a cyclohexyl group, (F) refers to fluorine or hydrogen, and $R^{22}$ refers to a C2-C10 alkyl group, fluorine, or a cyano group.

According to an embodiment of the present application, Chemical Formula 1 may be any one group selected from Chemical Formulae 1-1 to 1-11,

[Chemical formula 1-1]

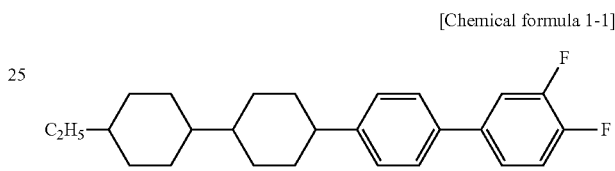

[Chemical formula 1-2]

[Chemical formula 1-3]

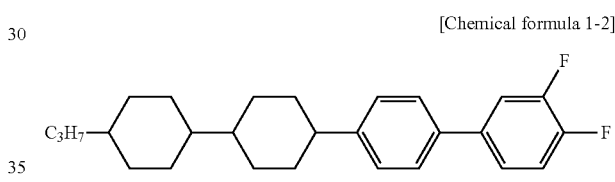

[Chemical formula 1-4]

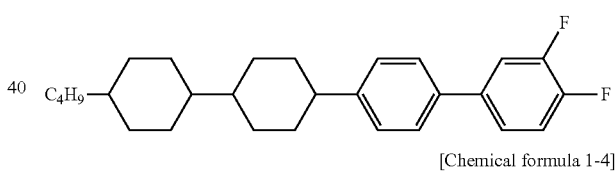

[Chemical formula 1-5]

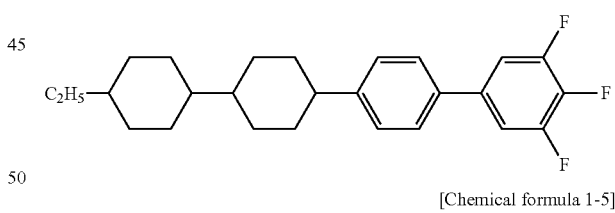

[Chemical formula 1-6]

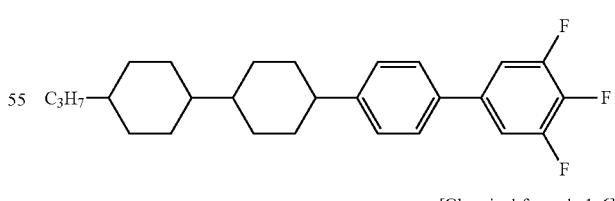

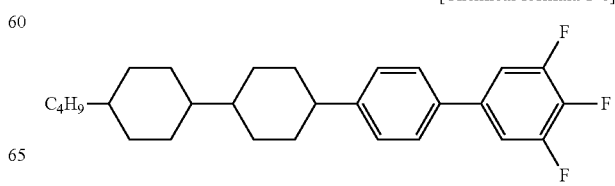

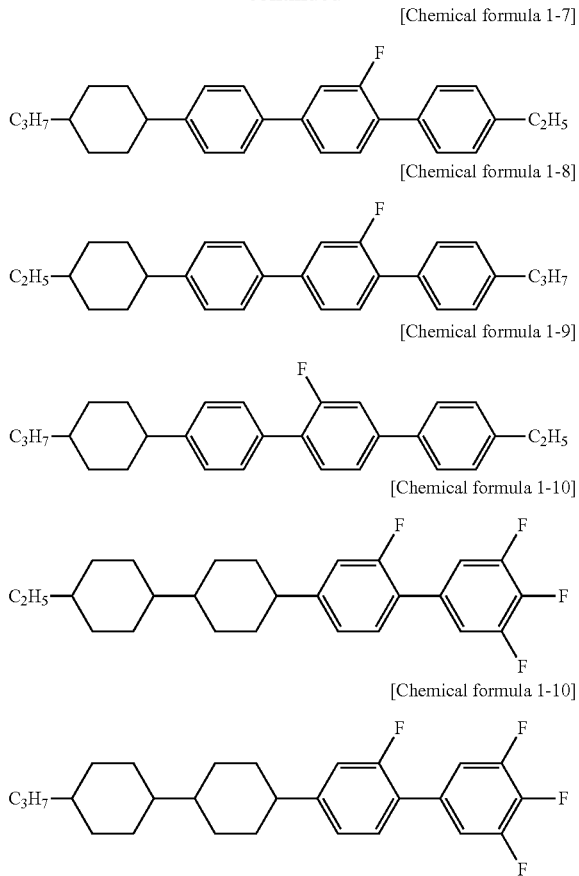

[Chemical formula 1-7]

[Chemical formula 1-8]

[Chemical formula 1-9]

[Chemical formula 1-10]

[Chemical formula 1-10]

The first compound is an essential material in order to maintain the transparent point of the liquid crystal droplet 111 at 100° C. or higher.

According to an embodiment of the present application, the first compound represented by Chemical Formula 1 may be 3 to 20 wt %. Specifically, the wt % means 3 to 20 wt % based on the total content of the liquid crystal droplet 111. In order for the liquid crystal droplet 111 to maintain a transparent point of 100° C. or more, the first compound needs to be maintained at 3 to 20 wt %.

On the other hand, when the first compound is less than 3 wt %, it may be difficult to maintain the transparent point of the liquid crystal droplet 111 at 90° C. or higher.

In addition, when the first compound exceeds 20% by weight, the possibility of crystallization at low temperatures increases, causing a problem of precipitation of crystals.

According to an embodiment of the present application, the liquid crystal droplet 111 may further include a second compound represented by Chemical Formula 2.

[Chemical formula 2]

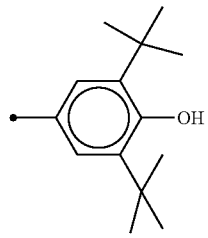

The second compound represented by Chemical Formula 2 serves to prevent a chain reaction during a radical reaction by heat in the PDLC layer 110.

According to an embodiment of the present application, the second compound may have a concentration in the range of 50 to 1000 ppm. In order to secure the thermal stability of the PDLC layer 110, the second compound needs to be maintained at a concentration in the range of 50 to 1000 ppm.

On the other hand, when the concentration of the second compound is less than 50 ppm, there is a problem that the effect of preventing the radical reaction by heat in the PDLC layer 110 decreases, and as a result, the thermal stability in the PDLC layer 110 decreases.

In addition, when the concentration of the second compound exceeds 1000 ppm, the transparent point of the liquid crystal droplet (111) decreases, resulting in a problem of deteriorating the electro-optical characteristics of the polymer dispersed liquid crystal display (100).

According to an embodiment of the present application, the polymer 112 may be formed of a polymer precursor including a third compound represented by Chemical Formula 3.

In this case, the polymer precursor may be said to be before the polymer 112 is cured. Specifically, the polymer precursor includes the third compound represented by Chemical Formula 3, and the polymer 112 may be formed by curing. The polymer or monomer having the structure shown in Chemical Formula 3 is an acrylate-based photocurable polymerizable material, and $R^{33}$ means a methyl group or hydrogen.

[Chemical formula 3]

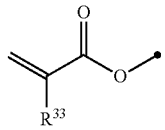

Also, according to an embodiment of the present application, when the liquid crystal droplet 111 does not contain the fourth compound represented by the following Chemical Formula 4, the size of the liquid crystal droplet 111 may be adjusted in the range of 0.8 to 1.5 μm. Specifically, according to an embodiment of the present application, when the liquid crystal droplet 111 includes the fourth compound, it is not easy to manufacture the size of the liquid crystal droplet 111 in the range of 0.8 to 1.5 μm.

[Chemical formula 4]

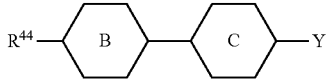

In Chemical Formula 4, $R^{44}$ refers to any one of an alkyl group and an ethylene group, Y refers to an ethylene group (—CH2=CH2), and ring B and ring C refer to a cyclohexyl group. When there are the ethylene group (—CH2=CH2) and the cyclohexyl group as described above, the absorption wavelength of the acrylate monomer of the third compound represented by Chemical Formula 3 is absorbed instead of the ethylene group (—CH2=CH2) and cyclohexyl group. As a result, when curing is performed on the polymer 112, there is a problem that the liquid crystal droplet 111 becomes excessively large.

Therefore, in order to manufacture the size of the liquid crystal droplet 111 in the range of 0.8 to 1.5 μm, the liquid crystal droplet 111 should not contain a fourth compound represented by Chemical Formula 4.

According to an embodiment of the present application, the PDLC layer 110 may have a thickness in the range of 15 μm to 25 μm. Specifically, in order to scatter the liquid crystal droplets 111 and to stabilize the manufacturing process of the polymer dispersed liquid crystal display 100, the PDLC layer 110 preferably has a thickness in the range of 15 μm to 25 μm.

According to an embodiment of the present application, the liquid crystal droplet 111 may include a plurality of liquid crystals. According to an embodiment of the present application, the liquid crystal may have refractive index anisotropy in the range of 0.20 to 0.25. Specifically, when the liquid crystal has refractive index anisotropy in the range of 0.20 to 0.25, a shielding effect is generated even in the scattering mode in a high temperature state.

However, if the refractive index anisotropy of the liquid crystal in the liquid crystal droplet (111) is less than 0.20, the side haze according to the viewing angle is improved in the transmission mode to improve the viewing angle, but the haze decreases in the high-temperature scattering mode, resulting in a problem of lowering the shielding function.

In addition, when the refractive index anisotropy of the liquid crystal in the liquid crystal droplet (111) exceeds 0.25, the side haze according to the viewing angle increases in the transmission mode, resulting in a decrease in the viewing angle.

According to an embodiment of the present application, the polymer dispersed liquid crystal display 100 may be provided with a power source 130 capable of applying a driving voltage to the first electrode 121 and the second electrode 122.

Figure 4A:
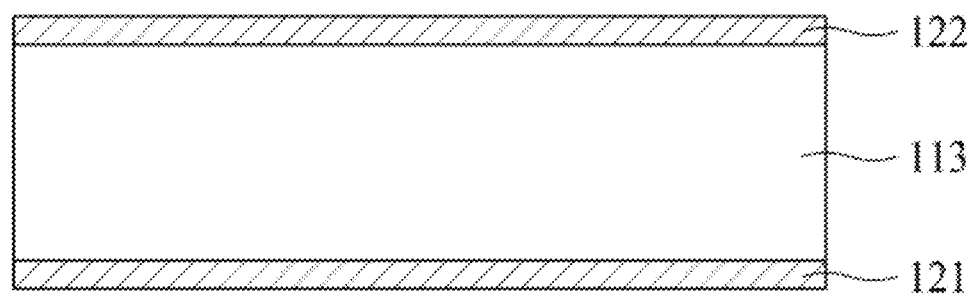
FIGS. 4A, 4B, and 4C are diagrams showing a manufacturing process of a polymer dispersed liquid crystal display.
Figure 4B:
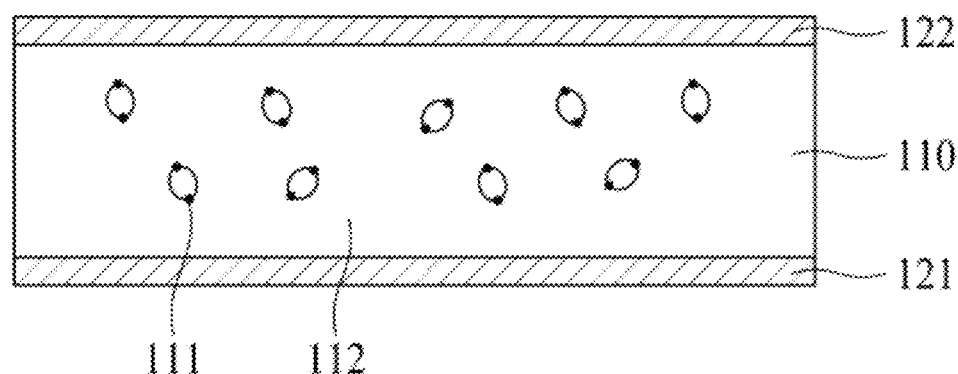
Figure 4C:
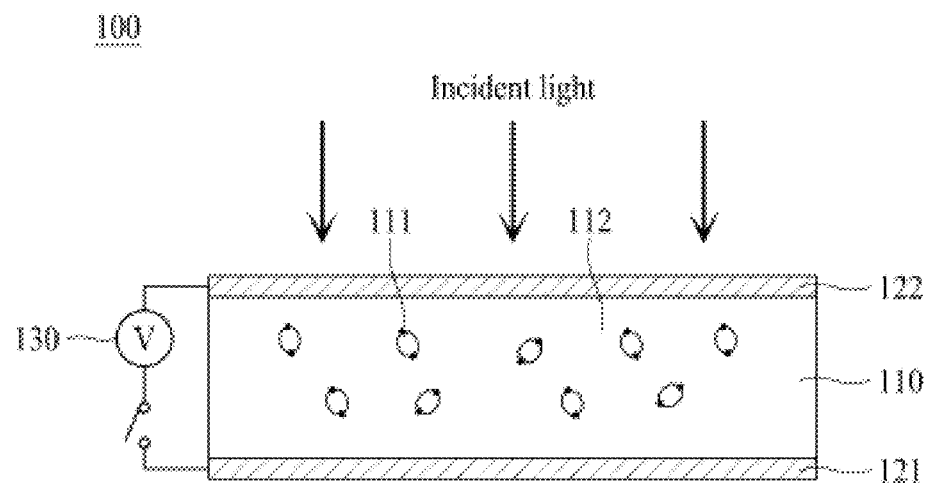
Figure 4C:
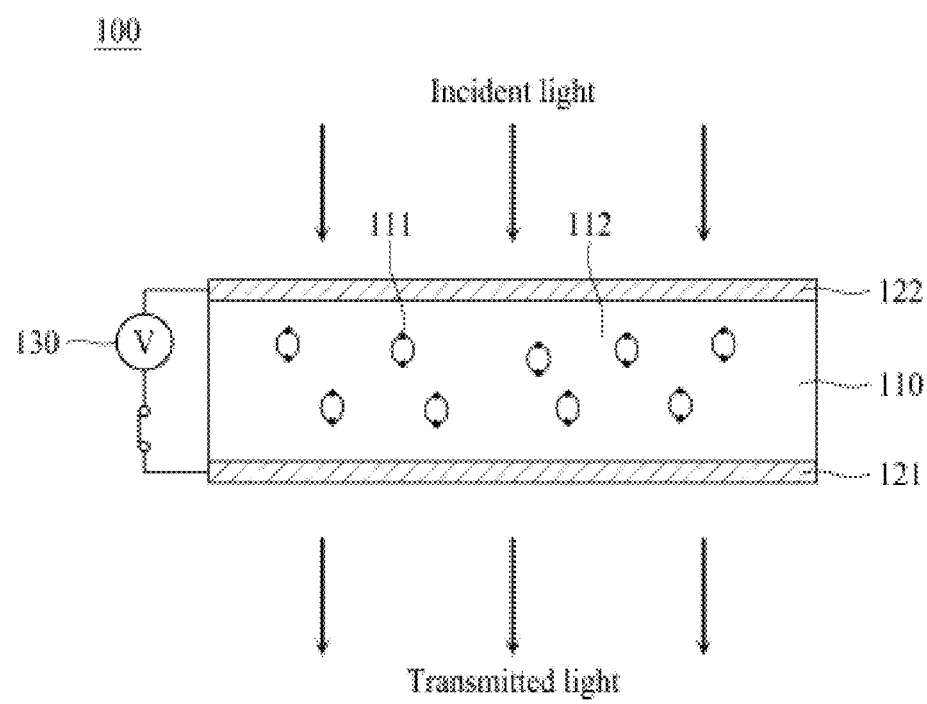

Referring to FIG. 4C, the electric field may not be generated between the first electrode 121 and the second electrode 122 in a state in which the driving voltage is not applied to the first electrode 121 and the second electrode 122, that is, an open circuit state. In this case, the liquid crystal droplet 111 is disposed without a certain directionality, and the incident light is scattered to cause an opaque scattering state.

Also, referring to FIG. 4C, the first electrode 121, the second electrode 122, and the power source 130 may be electrically connected to each other, such that an electric field may be generated between the first electrode 121 and the second electrode 122 in a closed circuit state. The direction of the electric field may be perpendicular to the first electrode 121 and the second electrode 122. The liquid crystal droplets 111 may be aligned in a direction parallel to the electric field. That is, the major axis of the liquid crystal droplet 111 is disposed parallel to the direction of the electric field, and incident light passes without scattering to become a transparent transmission state.

FIG. 2 is an image according to a viewing angle when viewed from the front and the side through a polymer dispersed liquid crystal display in an on state.

Specifically, the left image of FIG. 2 is an image viewed through PDLC from the front (0° polar angle), and the right image of FIG. 2 is an image viewed through PDLC from the side (70° polar angle).

In general, a haze difference between the front and the side occurs due to the refractive index anisotropy of the liquid crystal while electricity is applied to the polymer dispersed liquid crystal display (100).

Specifically, referring to FIG. 2, since the haze of the side surface is higher than the front surface, a clear image cannot be obtained.

The reason why this side haze is important is that when the polymer dispersed liquid crystal display 100 is applied to the sunroof, the occupant mostly looks at the polymer dispersed liquid crystal display 100 from the side rather than the front. When the polar angle viewed by the occupant from the front is 0°, the occupant mostly looks at the polar angle of 60° to 70°, so it is important to improve the haze.

Figure 3:
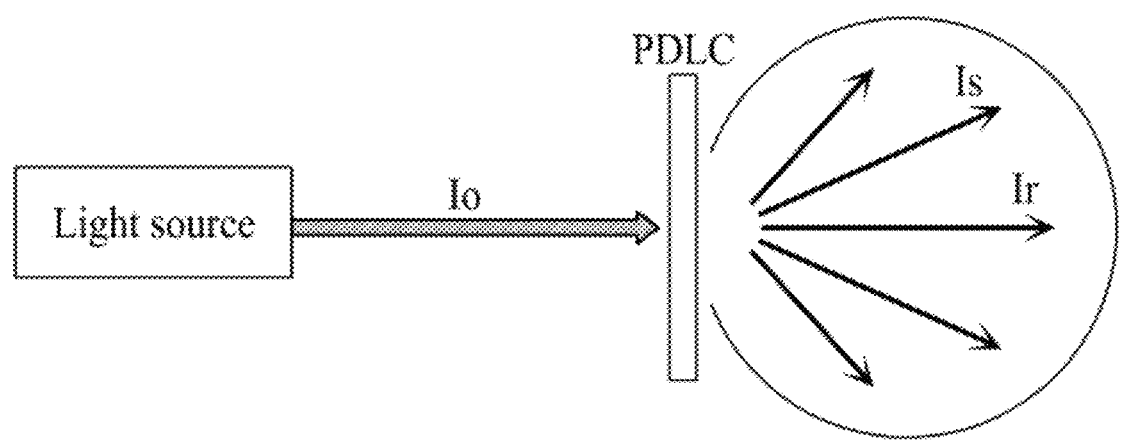
FIG. 3 is a schematic diagram showing a haze measurement method.
Figure 3:
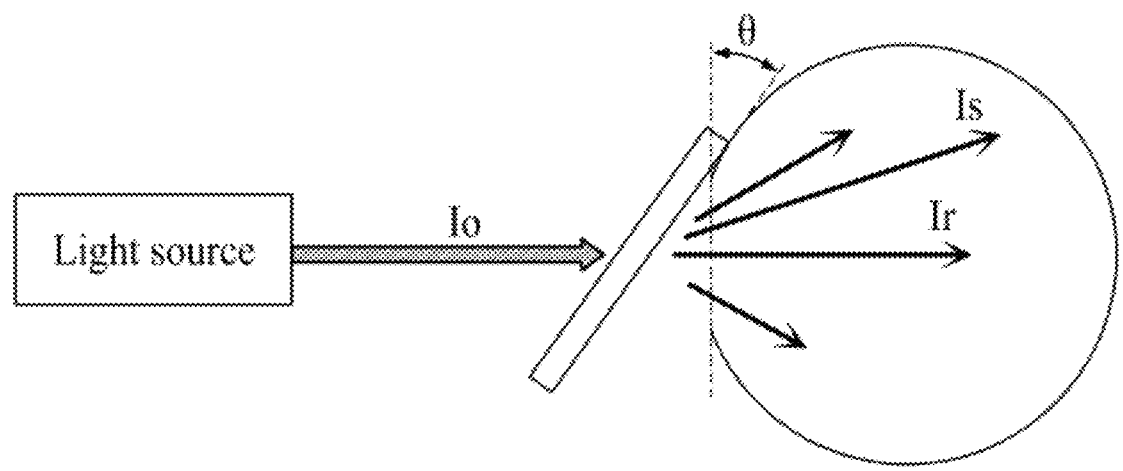

FIG. 3 is a schematic diagram showing a haze measurement method.

Specifically, FIG. 3 is a schematic diagram showing a haze measurement method for a polymer dispersed liquid crystal (PDLC). Here, the polymer dispersed liquid crystal (PDLC) may correspond to the PDLC layer 110 of the present application.

Referring to FIG. 3, light incident on the polymer dispersion liquid crystal (PDLC) is defined as I0, the light through which the incident light (I0) is transmitted head-on in an error range of ±2.5° is defined as Ir, and when Is is the light excluding the light (Ir) transmitted head-on among the transmitted light, haze is defined as Is/(Ir+Is).

In this case, the left image of FIG. 3 is an image showing measuring the front haze, and the right image of FIG. 3 is an image showing measuring the side haze.

FIGS. 4A to 4C are diagrams showing a manufacturing process of the polymer dispersed liquid crystal display 100.

Specifically, referring to FIG. 4A, in the manufacturing process of the polymer dispersed liquid crystal display 100, a polymer dispersed liquid crystal mixture 113 was applied to one surface of the first electrode 121 and then the second electrode 122 was combined thereon using a roller to produce the polymer dispersed liquid crystal cell 101.

Then, referring to FIG. 4B, the first electrode 121 including the polymer liquid crystal mixture 113 was irradiated with ultraviolet rays (UV) to cure the polymer liquid crystal mixture 113 to manufacture the polymer dispersed liquid crystal display 100.

Next, referring to FIG. 4C, a power source 130 connecting the first electrode 121 and the second electrode 122 may be installed.

In this case, the electric field may not be generated between the first electrode 121 and the second electrode 122 in a state in which a driving voltage is not applied to the first electrode 121 and the second electrode 122, that is, an open circuit state. In this case, the liquid crystal droplet 111 may be disposed without a certain direction.

Also, the first electrode 121, the second electrode 122, and the power source 130 may be electrically connected to each other, such that an electric field may be generated between the first electrode 121 and the second electrode 122 in a closed circuit state. The direction of the electric field may be perpendicular to the first electrode 121 and the second electrode 122. The liquid crystal droplets 111 may be aligned in a direction parallel to the electric field. That is, the major axis of the liquid crystal droplet 111 may be parallel to the direction of the electric field.

Hereinafter, the present application will be described in detail with reference to embodiments and comparative examples. However, the following embodiments are only for helping the understanding of the present application, and the scope of the present application is not limited to these embodiments.

Embodiments 1-5 and Comparative Examples 1-4

In order to improve the present application, a polymer dispersed liquid crystal display was prepared using various polymer liquid crystal mixtures. The content of the polymer liquid crystal mixture is shown in Table 1 below.

Example 1

BP008 (Bayi Co., Ltd.) was used as a polymer liquid crystal mixture, and in BP008, there are 8% by weight of (Chemical Formula 1-5) and 7% by weight of (Chemical Formula 1-9) in liquid crystal droplets, and 250 ppm of an antioxidant (4-sec-butyl-2,6-di-tert-butylphenol; Chemical Formula 2) is mixed. The first electrode and the second electrode were used by sputtering ITO to a PET product of Toyobosa Co., Ltd.'s A4165 PET product, and the polymer liquid crystal mixture was coated with a slot die to proceed with the integrated amount of 1 J by using a 3 mW/cm2 ultraviolet lamp with a wavelength of 365 nm. During the process, the temperature was 25° C., and a PDLC layer of 17 μm was obtained after preparation.

Example 2

The polymer liquid crystal mixture was the same as in Example 1, except that 200 ppm of an antioxidant (Chemical Formula 2) was added in Example 1, and the PDLC manufacturing method was the same as in Example 1, except that the curing temperature was 30° C.

Example 3

The polymer liquid crystal mixture was the same as in Example 1, except that 300 ppm of an antioxidant (Chemical Formula 2) was added in Example 1, and the PDLC manufacturing method was the same as in Example 1, except that the curing temperature was 40° C.

Example 4

BP015 (Bayi Co.) was used as a polymer liquid crystal mixture, in BP015, 5% by weight of Chemical Formula 1-5, and 250 ppm of an antioxidant (4-sec-butyl-2,6-di-tert-butylphenol; Chemical Formula 2) was mixed.

The PDLC film was manufactured at a curing temperature of 35° C., and the remaining manufacturing method was manufactured in the same manner as in Example 1.

Example 5

BP016 (Bayi Co.) was used as a polymer liquid crystal mixture, in BP016, 5% by weight of Chemical Formula 1-4 and 5% by weight of Chemical Formula 1-5, and 250 ppm of an antioxidant (4-sec-butyl-2,6-di-tert-butylphenol; Chemical Formula 2) was mixed.

The PDLC film was manufactured at a curing temperature of 35° C., and the remaining manufacturing method was manufactured in the same manner as in Example 1.

Comparative Example 1

The polymer liquid crystal mixture is a mixture of 49% by weight of polymer precursor NOA65 (Edmond Optics Korea), 50% by weight of liquid crystal E7 (Merck Co., without Chemical Formula 1) and 1% by weight of argacure 651 (Shibasa).

The PDLC film was manufactured at a curing temperature of 30° C., and the remaining manufacturing method was manufactured in the same manner as in Example 1.

Comparative Example 2

The polymer liquid crystal mixture was the same as in Example 1, except that 15 ppm of an antioxidant (Chemical Formula 2) was added in Example 1, and the PDLC manufacturing method was the same as in Example 1, except that the curing temperature was 20° C.

Comparative Example 3

The polymer liquid crystal mixture was the same as in Example 1, except that 0 ppm of an antioxidant (Chemical Formula 2) was added in Example 1, and the PDLC manufacturing method was the same as in Example 1, except that the curing temperature was 50° C.

Comparative Example 4

BP013 (Bayi Co.) was used as a polymer liquid crystal mixture, in BP015, 10% by weight of Chemical Formula 1-5, 10% by weight of Chemical Formula 4 with $R^{44}$ of propyl(-C3H7), and 10 ppm of an antioxidant (4-sec-butyl-2,6-di-tert-butylphenol; Chemical Formula 2) is mixed.

The PDLC film was manufactured at a curing temperature of 40° C., and the remaining manufacturing method was manufactured in the same manner as in Example 1.

TABLE 1

| | | Liquid crystal drop composition | | |
| | Polymer/ liquid crystal mixture type | First compound (Chemical Formula 1) (% by weight) | Second compound (Chemical Formula 2) (ppm) | Fourth compound (Chemical Formula 4) (% by weight) |
| --- | --- | --- | --- | --- |
| Example 1 | BP008 | 15 | 250 | 0 |
| Example 2 | BP008 | 15 | 200 | 0 |
| Example 3 | BP008 | 15 | 300 | 0 |
| Example 4 | BP015 | 5 | 250 | 0 |
| Example 5 | BP016 | 10 | 250 | 0 |
| Comparative Example 1 | NOA65+E7 | 0 | 0 | 0 |
| Comparative Example 2 | BP008 | 15 | 15 | 0 |
| Comparative Example 3 | BP008 | 15 | 0 | 0 |

TABLE 1-continued

| | | Liquid crystal drop composition | | |
|---|---|---|---|---|
| | Polymer/ liquid crystal mixture type | First compound (Chemical Formula 1) (% by weight) | Second compound (Chemical Formula 2) (ppm) | Fourth compound (Chemical Formula 4) (% by weight) |
| Comparative Example 4 | BP013 | 10 | 10 | 10 |

TABLE 2

| | Temp. during curing (° C.) | Size of the liquid crystal droplet (μm) | Refractive index anisotropy | Room temperature side ON haze (%) | High temperature front OFF haze (%) | Presence or absence of a red shift | Amount of haze change after heating (%) |
|---|---|---|---|---|---|---|---|
| Example 1 | 25 | 1.30 | 0.25 | 12 | 94 | Absence | 0.3 |
| Example 2 | 30 | 1.19 | 0.25 | 11 | 94 | Absence | 0.2 |
| Example 3 | 40 | 0.95 | 0.25 | 9 | 91 | Absence | 0.2 |
| Example 4 | 35 | 1.10 | 0.23 | 10 | 92 | Absence | 0.2 |
| Example 5 | 35 | 1.15 | 0.20 | 10 | 92 | Absence | 0.25 |
| Comparative Example 1 | 35 | 1.52 | 0.25 | 15 | 20 | Absence | 3.0 |
| Comparative Example 2 | 20 | 1.80 | 0.25 | 17 | 95 | Absence | 2.5 |
| Comparative Example 3 | 50 | 0.65 | 0.25 | 8 | 88 | Presence | 2.4 |
| Comparative Example 4 | 40 | 1.51 | 0.23 | 18 | 95 | Absence | 2.6 |

For the polymer dispersed liquid crystal displays of Examples 1-5 and Comparative Examples 1-4 thus prepared, i) the size of the liquid crystal droplet, ii) the room temperature side ON haze, iii) the high temperature front OFF haze, iv) the presence or absence of a red shift, and v) the amount of haze change after heating were confirmed.

i) Liquid Crystal Droplet Size

It was measured using a scanning electron microscope (PE-300 SEM) manufactured by Youngin Science. Specifically, 20 liquid crystal droplet sizes were measured by magnifying at a magnification of 10,000, and the liquid crystal droplet sizes in Table 1 mean the average of 20 liquid crystal droplet.

ii) Measure Room Temperature Side ON Haze

The light incident on the polymer dispersion liquid crystal (PDLC) is defined as I0, the light through which the incident light (I0) is transmitted head-on in an error range of ±2.5° is defined as Ir, and when Is is the light excluding the light (Ir) transmitted head-on among the transmitted light, haze is defined as Is/(Ir+Is).

When measuring the side haze, the voltage is 48V, the viewing angle (θ) is 70°, and the temperature is 25° C.

NDH 7000II from Nippon Denshoku was used as the haze measuring instrument, and ASTM D 1003 was used as the measurement standard.

iii) Measure High Temperature Front Off Haze

The light incident on the polymer dispersion liquid crystal (PDLC) is defined as I0, the light through which the incident light (I0) is transmitted head-on in an error range of ±2.5° is defined as Ir, and when Is is the light excluding the light (Ir) transmitted head-on among the transmitted light, haze is defined as Is/(Ir+Is).

When measuring the front haze, the voltage is 0V, the viewing angle (θ) is 0°, and the temperature is 90° C.

NDH 7000II from Nippon Denshoku was used as the haze measuring instrument, and ASTM D 1003 was used as the measurement standard.

iv) Check for Red Variation

The presence or absence of a red variation in the prepared polymer dispersed liquid crystal display was determined with the naked eye.

v) Measure the Amount of Haze Change After Heating

The amount of haze change after heating is calculated by measuring the amount of change in haze at room temperature after producing a 17 μm PDLC layer, putting it in an oven at a temperature of 80° C., heating it for 168 hours.

Referring to Tables 1 and 2, in Examples 1 to 5, when the liquid crystal drop size is 0.7 to 1.50 μm, the on-state side haze has a value of 9 to 12% at room temperature. In the case of Comparative Example 3 in which the liquid crystal droplet size was made 0.7 μm or less, a red shift appeared, and in the case of Comparative Examples 1, 2, and 4 in which the liquid crystal droplet size was made 1.5 μm or more, the side haze has a high value of 15% or more.

Comparative Example 1 without (Chemical Formula 1) has an off-state front haze of 20% at high temperature, which is very low compared to other Comparative Examples and Examples. Therefore, (Chemical Formula 1) is a key factor in maintaining the shielded state of PDLC at high temperature.

Comparing the Comparative Example without or with a trace amount of (Chemical Formula 2) and the Example with 100 ppm or more, the "haze change amount after heating" is 2.0 to 3.0% in the Comparative Example, but the Example is a good level of 1.0% or less.

Comparative Example 4 including (Chemical Formula 4) has a curing temperature of 40° C. which is higher than or similar to Example, but has a liquid crystal droplet size of 1.51 μm which is larger than 1.50 μm. For this reason, the side haze is very high at 18%.

According to the present disclosure, the following advantageous effects may be obtained.

The polymer dispersed liquid crystal display according to an embodiment of the present application may improve side haze in a transmission state in which electricity is applied.

The polymer dispersed liquid crystal display according to an embodiment of the present application may achieve complete shielding by increasing haze in a scattering state in which electricity is not applied at a high temperature.

In addition to the above-mentioned effects, other features and advantages of the present application may be described below, or may be clearly understood by those of ordinary skill in the art to which the present application belongs from such techniques and descriptions.

In addition to the above-mentioned effects, other features and advantages of the present invention may be described below, or may be clearly understood by those of ordinary skill in the art to which the present invention belongs from such techniques and descriptions.

In addition to the above-mentioned effects, other features and advantages of the present invention will be described below or clearly understood by those of ordinary skill in the art to which the present invention belongs from such technology and description.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A polymer dispersed liquid crystal (PDLC) display, comprising:
    a first electrode;
    a second electrode on the first electrode; and
    a PDLC layer,
    wherein the PDLC layer is disposed between the first electrode and the second electrode,
    wherein the PDLC layer includes a liquid crystal droplet with a size in a range of 0.8 to 1.5 μm, and including a plurality of liquid crystals,
    wherein the PDLC layer has a thickness in a range of 15 to 25 μm, and
    wherein the liquid crystal droplet further includes a second compound represented by 4-sec-butyl-2,6-di-tert-butylphenol.

2. The polymer dispersed liquid crystal display of claim 1, wherein the liquid crystal droplet has refractive index anisotropy in a range of 0.20 to 0.25.

3. The polymer dispersed liquid crystal display of claim 1, wherein the liquid crystal droplet has a transparent point of 90° C. or higher.

4. The polymer dispersed liquid crystal display of claim 1, wherein the liquid crystal droplet includes a first compound represented by Chemical Formula 1:

Chemical Formula 1

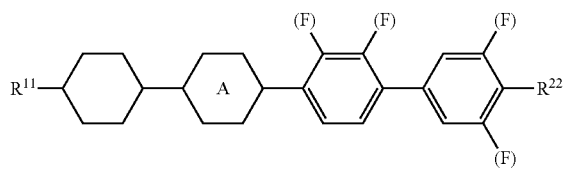

$R^{11}$ refers to a C2-C10 alkyl group, an ethylene group, or an alkoxy group,
(F) refers to fluorine or hydrogen,
ring A refers to a phenyl group or a cyclohexyl group, and
$R^{22}$ refers to a C2-C10 alkyl group, fluorine, or a cyano group.

5. The polymer dispersed liquid crystal display of claim 4, wherein the first compound is 3 to 20% by weight based on a total content of the liquid crystal droplet.

6. The polymer dispersed liquid crystal display of claim 1, wherein the second compound has a concentration in a range of 50 to 1000 ppm.

7. The polymer dispersed liquid crystal display of claim 1, wherein the liquid crystal droplet does not contain a fourth compound represented by Chemical Formula 4:

Chemical Formula 4

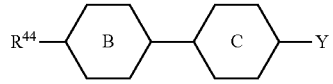

$R^{44}$ refers to any one of an alkyl group and an ethylene group,
Y refers to an ethylene group (—$CH_2$=$CH_2$—), and
ring B and ring C refer to a cyclohexyl group.

8. The polymer dispersed liquid crystal display of claim 1, wherein the first electrode and the second electrode include a transparent conductive material.

9. The polymer dispersed liquid crystal display of claim 8, wherein the transparent conductive material includes at least one of indium tin oxide (ITO) and indium zinc oxide (IZO).

10. A smart window comprising the polymer dispersed liquid crystal display of claim 1.

* * * * *